May 27, 1924.
J. KRAMER ET AL
1,495,698
CUSHION STUFFING MACHINE
Filed April 17, 1922
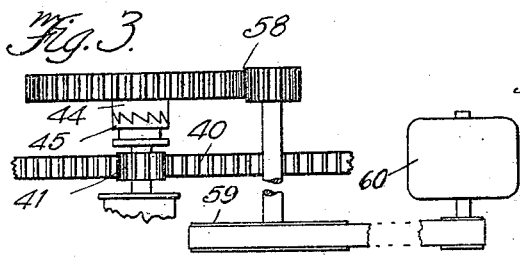
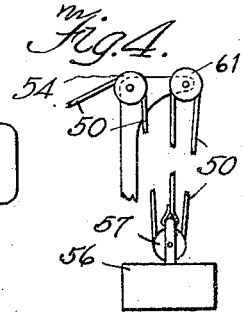
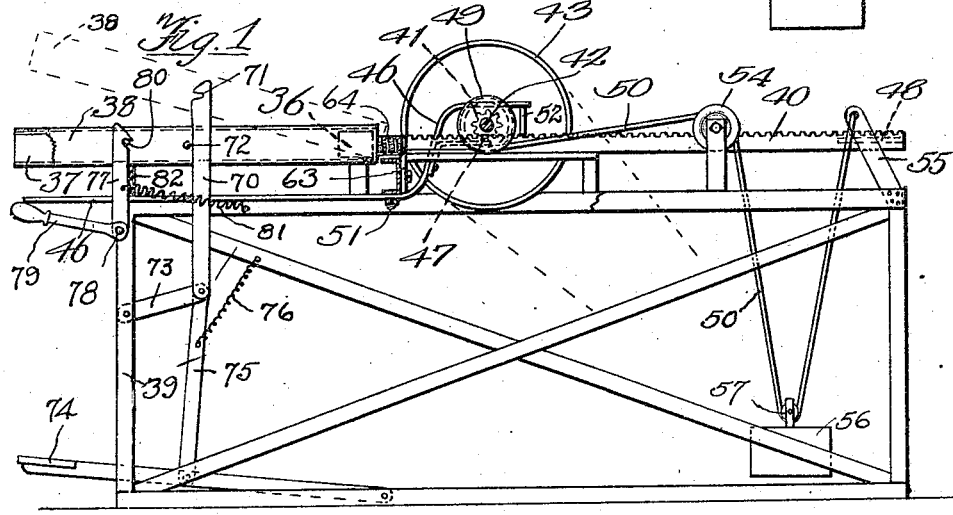
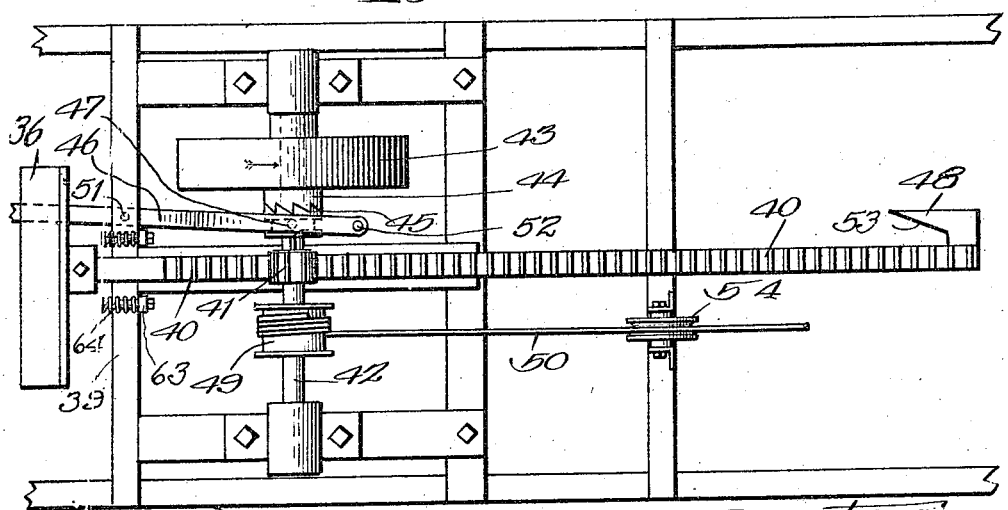
Inventors:
Julius Kramer and Walter H. Kopplin
By Kent W. Worrell Atty.

Patented May 27, 1924.

1,495,698

UNITED STATES PATENT OFFICE.

JULIUS KRAMER AND WALTER H. KOPPLIN, OF CHICAGO, ILLINOIS, ASSIGNORS TO PULLMAN DAVENPORT & UPHOLSTERED FURNITURE COMPANY, OF CHICAGO, ILLINOIS, A CORPORATION OF ILLINOIS.

CUSHION-STUFFING MACHINE.

Application filed April 17, 1922. Serial No 553,704.

*To all whom it may concern:*

Be it known that we, JULIUS KRAMER and WALTER H. KOPPLIN, both citizens of the United States, residing at Chicago, in the county of Cook and State of Illinois, have invented certain new and useful Improvements in a Cushion-Stuffing Machine, of which the following is a specification.

This invention relates to a machine for stuffing pillows, cushions, and the like, but more particularly it relates to the mechanism for advancing and retarding the plunger. The principal object of the invention is, to provide means for insuring that the plunger will be actuated not more than one complete movement; to automatically trip the plunger from one direction of movement and to return it under a different power; to utilize a weight for returning the plunger; and in general, to produce the construction herein shown and described.

In the accompanying drawings, Fig. 1 is a side elevation of a cushion stuffing machine embodying this invention; Fig. 2 is a plan view illustrating the mechanism; Fig. 3 is a plan view of alternative driving mechanism; and Fig. 4 is a modified weight and pulley arrangement.

This invention comprises a plunger head 36 which is movable in a cushion stuffing holder which comprises a fixed base member 37 and a movable top member 38 open at the front end for the reception of a cushion cover, the sections being adjustable and movable in any manner now well known in this art. The mechanism constituting the subject matter of this invention is that for advancing and retarding the plunger in the cushion stuffing holder.

Attached to the plunger head 36 is a plunger rod or bar having teeth in one face constituting a rack for the engagement of a pinion 41 which is mounted for rotation upon a shaft 42.

Freely mounted on the shaft on one side of the rack is a driving member 43 which may be a pulley, and attached to the pulley is a toothed clutch member 44 adapted to be engaged by a co-operating clutch member 45 which is keyed to the shaft 42 but is slidable longitudinally thereof. An operating lever 46 has a fixed pivot 51 on the frame 39 intermediate the ends of the lever, one end of which extends forwardly adjacent the front of the machine where it can be manually actuated, and the other end extends over and beyond the shaft 42, the lever and its extension carrying projections 47 which engage in a groove in the movable clutch member 45 so that this clutch member is controlled by the lever. At the inner end of the lever 46 is a pin or projection 52 which is moved into the path of the cam or wedging surface 53 of a plate 48 attached to the end of the plunger bar 40. The engagement of this plate with the projection 52 disengages the movable clutch member 45 and stops the forward movement of the plunger bar 40.

Secured to the shaft 42 is a drum 49 upon which a cable 50 is wound and one end of the cable attached to the drum. This cable passes over a pulley 54 and the other end of the cable is attached to a fixed projection 55 with a weight 56 suspended by means of a pulley 57 between the pulley 54 and the projection 55. This cable 50 is wound upon the drum 49 in such a direction that it rotates the pinion 41 in a direction opposite the rotation of the power member 43 returning the plunger bar 40 to its normal or retracted position.

Instead of having a power pulley mounted directly upon the shaft 42, a train of reducing gears 58 may be connected to the clutch member 44, as shown in Fig. 3, with a power member 59 which may be a gear or a pulley connected to a high speed driving motor 60.

In order to return the plunger bar 40 more slowly, a second pulley 61 is provided for the cable 50 which is first passed around the pulley 57 attached to the weight, and then passed around the second pulley 61, and the end of the cable attached to the weight. This makes a three-strand support for the weight which returns the bar 40 more gently. Attached to the frame in a position to engage the plunger head 36 upon its return movement are springs 64 held in place by supports 63 which cushion the impact of the plunger bar and head at this end of their movement.

To engage the cover 38 in its partially closed position, a pair of hook arms 70 are mounted at the sides of the arm with notches 71 at the upper ends adapted to engage projections 72 at the sides of the cover, These arms 70 are connected together below the base member 37 and are mounted to swing upon links 73. At the bottom of the frame is a foot lever 74 connected by means of links 75 with the hook arms 70 and a spring 76 tends to hold the foot lever 74 and the hook arms 70 in a raised position. Also mounted at each side of the frame 39, are hook arms 77 connected by a common shaft 78 and having an operating lever 79 at one side of the machine. A second pin or projection 80 extends from each side of the cover 38 in a position to be engaged by the hooks at the upper ends of the arms 77, and a spring 81 tends to hold the arms 77 against fixed projections 82 in the engaging position. The operation of this feature of the invention is that the cover 38 is swung downwardly until the projections 72 engage with the notches 71 of the arms 70 whereupon the foot lever 74 is engaged by the operator moving the cover 38 downwardly, by the added weight of the operator until the projections 80 engage with the fastening arms 77. This will hold the cover in its lowermost position against the bulging stuffing placed upon the table and in order to release the cover the lever 79 is pressed downwardly against the action of the spring 81 which disengages the hook arms 77 from the projections 80.

In operation it is necessary only to swing the lever 46 upon its pivot to engage the movable clutch member 45 with the constantly rotating clutch member 44. This will actuate the pinion 41 to advance the plunger bar 40 and its plunger head 36 until the cam surface 53 engages the projection 52 on the end of the operating lever 46 which will then automatically move the lever throwing the clutch member 45 out of its clutching engagement. The advancing movement of the pinion 41 has wound up the cable 50 on the drum 49 so that as soon as the clutch member 45 is disengaged, the weight 56 acts to return the plunger bar to its normal retracted position in engagement with the cushioning springs 64.

We claim:

1. In a cushion making machine, a reciprocable plunger, means for operating the plunger in both directions including a continuously operated driving member, and means for limiting the movement of the plunger to not more than one advancing and retracting movement, at each actuation thereof, the means for effecting the retracting movement of the plunger including a weight lifted on the advancing movement thereof.

2. In a cushion making machine, a reciprocable plunger, continuously operating power means for advancing the plunger, gravity means for retracting the plunger, and means for insuring that the plunger will be moved not more than one complete advancing and retracting movement at each actuation thereof.

3. In a cushion making machine, a reciprocable plunger, continuously operating power means for actuating the plunger in one direction, and a weight actuated by the power means for returning the plunger in the opposite direction.

4. In a cushion making machine, a reciprocable plunger, continuously operating power means for actuating the plunger in one direction, a tripping device carried by the plunger, and gravity means actuated by the power means for returning the plunger after the operation of the tripping device.

5. In a cushion making machine, a reciprocable member, continuously rotatable power means including a clutch member, a driving pinion for advancing and retracting the reciprocable member, a movable clutch member for connecting the pinion with the other clutch member, means for disengaging the clutch members when the plunger is at one end of a stroke, and plunger returning means energized by the power member for rotating the pinion to return the reciprocable member when the clutch members are separated.

6. In a cushion stuffing machine, a reciprocable plunger rack, a pinion engaging the rack, a shaft upon which the pinion is mounted, a driving member including a clutch part rotatable upon the shaft, a clutch member keyed to the shaft engageable with the other clutch member, a lever for moving the clutch members into engagement, means for automatically disengaging the clutch members at one end of the plunger stroke, and means including a winding drum in connection with the shaft and a weight for returning the plunger to the other end of the stroke.

7. In a cushion making machine, a reciprocable plunger, a rotatable member for moving the plunger in opposite directions, a power member, a clutch for engaging the rotatable and power members to move the plunger in one direction, means for reversely rotating said rotatable member to move the plunger in the opposite direction, a lever for operating the clutch, and a member carried by the plunger for engaging the lever at one end of the plunger stroke to throw the clutch out of engagement.

8. In a cushion making machine, a reciprocable plunger, a rotatable member for moving the plunger in opposite directions, continuous power actuated means for moving the member in one direction of rotation, a winding drum in connection with the rotatable member, a cable attached to the drum, a weight in connection with the cable for moving the rotatable member to retract the plunger.

9. In a cushion making machine, a reciprocable plunger rack, a pinion engaging the rack, a shaft upon which the pinion is mounted, a power element rotatable upon the shaft and carrying a toothed clutch part, a movable clutch member keyed to the shaft engageable with the clutch part, a lever for moving the clutch member having a projection at its inner end, a plate having a wedging surface adapted to engage the said projection for throwing the clutch member out of engagement with the clutch part and for limiting the movement of the plunger, a drum attached to the shaft, a cable one end of which is attached to the drum, a fixed projection to which the other end of the cable is attached, and a pulley over which the cable passes, and a weight slidingly mounted upon the cable between the pulley and the projection for rotating the drum and retracting the plunger after the clutch member has been disengaged and the plunger stopped by means of the wedging plate.

10. In a cushion making machine, a reciprocable plunger, a rotatable member for moving the plunger in opposite directions, continuous power actuated means for moving the member in one direction of rotation, a winding drum in connection with the rotatable member, a cable attached to the drum, a weight in connection with the cable for moving the rotatable member to retract the plunger, and a fixed cushioning spring to engage the plunger at the end of its retracted movement.

JULIUS KRAMER.
WALTER H. KOPPLIN.